(12) United States Patent
Prud'Homme-Lacroix

(10) Patent No.: US 9,487,292 B2
(45) Date of Patent: Nov. 8, 2016

(54) SYSTEM FOR FASTENING A LOAD TO A ROTORCRAFT, AND A ROTORCRAFT

(71) Applicant: AIRBUS HELICOPTERS, Marignane (FR)

(72) Inventor: Pierre Prud'Homme-Lacroix, Vitrolles (FR)

(73) Assignee: Airbus Helicopters, Marignane (FR)

( * ) Notice: Subject to any disclaimer, the term of this patent is extended or adjusted under 35 U.S.C. 154(b) by 262 days.

(21) Appl. No.: 14/196,167

(22) Filed: Mar. 4, 2014

(65) Prior Publication Data
US 2014/0252169 A1    Sep. 11, 2014

(30) Foreign Application Priority Data
Mar. 7, 2013    (FR) ...................................... 13 00520

(51) Int. Cl.
*B64C 1/22*     (2006.01)
*B64D 9/00*     (2006.01)
*B64D 1/22*     (2006.01)
*B64C 27/04*    (2006.01)

(52) U.S. Cl.
CPC . *B64D 9/00* (2013.01); *B64D 1/22* (2013.01); *B64C 27/04* (2013.01); *Y10T 29/49947* (2015.01)

(58) Field of Classification Search
CPC ................ B64C 27/04; B64C 27/473; B64C 2201/024; B64C 1/22
USPC ........ 244/17.11, 17.15, 100 R, 118.1, 129.1, 244/131, 137.3, 137.4
See application file for complete search history.

(56) References Cited

U.S. PATENT DOCUMENTS 3,044,818 A * 7/1962 Tobey ........................ B64C 1/22
                                                      244/118.1
3,716,208 A * 2/1973 Fagan ...................... B64C 25/52
                                                      244/108
4,378,919 A * 4/1983 Smith ....................... B64D 1/22
                                                      244/118.1
4,558,837 A * 12/1985 Mens ....................... B64C 25/00
                                                      244/104 FP (Continued)

FOREIGN PATENT DOCUMENTS

DE       19623562        12/1997
FR    EP 2774848 A1 *    9/2014   ............... B64D 9/00
GB       1594443         7/1981

OTHER PUBLICATIONS

French Search Report for FR 1300520, Completed by the French Patent Office on Dec. 12, 2013, 6 Pages.

*Primary Examiner* — Benjamin P Lee
(74) *Attorney, Agent, or Firm* — Brooks Kushman P.C.

(57) ABSTRACT

A fastener system (10) having attachment means (15) for attaching an external load to a rotorcraft, said fastener system (10) having a support beam (20) for attaching the attachment means (15) to a rotorcraft, said support beam (20) having a horizontal core (25) and two lateral section members (30) extending in elevation from said horizontal core (25), said fastener system (10) having a support member (50) in a central space (100) between said lateral section members (30) to carry attachment means (15), said support member (50) being connected to each lateral section member (30). Each lateral section member (30) includes a web (31) in elevation connected to the horizontal core (25), each web (31) presenting an obtuse angle (α) relative to said horizontal core (25) in said central space (100), each lateral section member (30) being a sloping section member capable of moving closer to said horizontal core (25) under the effect of vertical forces.

19 Claims, 2 Drawing Sheets

(56) References Cited

U.S. PATENT DOCUMENTS

| | | | |
|---|---|---|---|
| 4,637,575 A | 1/1987 | Yenzer | |
| 4,993,665 A * | 2/1991 | Sparling | B64D 9/00 244/118.1 |
| 5,190,250 A | 3/1993 | Delong et al. | |
| 6,059,266 A | 5/2000 | Ascherin et al. | |
| 6,533,220 B2 * | 3/2003 | Schuster | H02G 1/02 244/118.1 |
| 8,561,945 B2 * | 10/2013 | Engleder | B64C 25/12 244/102 R |
| 8,733,691 B2 * | 5/2014 | Landry | B64C 25/52 244/17.17 |
| 8,800,919 B2 * | 8/2014 | Ferrier | B64C 25/52 244/100 A |
| 8,919,694 B2 * | 12/2014 | Amante | B64C 25/52 244/108 |
| 9,139,300 B2 * | 9/2015 | Shrapnel | B64D 1/22 |
| 2002/0171008 A1 * | 11/2002 | Schuster | H02G 1/02 244/118.1 |
| 2007/0057117 A1 * | 3/2007 | Payen | B64C 25/00 244/100 R |
| 2007/0063100 A1 * | 3/2007 | Bailey | B64C 1/062 244/118.1 |
| 2011/0204181 A1 * | 8/2011 | Hill | B64D 25/00 244/100 A |
| 2012/0037759 A1 * | 2/2012 | Vorwald | B64D 1/22 244/137.4 |
| 2013/0270393 A1 * | 10/2013 | Shrapnel | B64C 25/52 244/137.4 |
| 2014/0252170 A1 * | 9/2014 | Prud'Homme-Lacroix | B64C 7/00 244/121 |

* cited by examiner

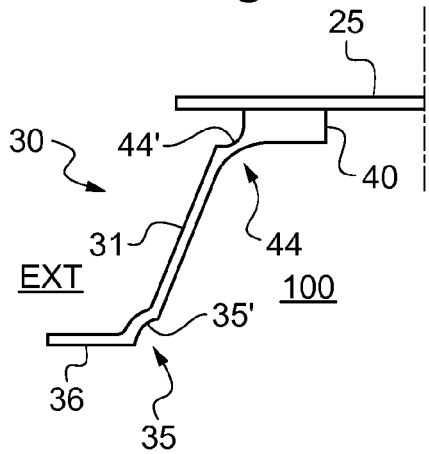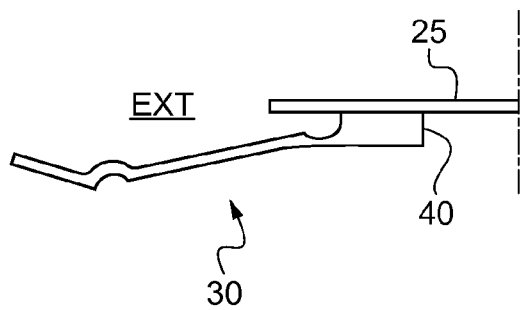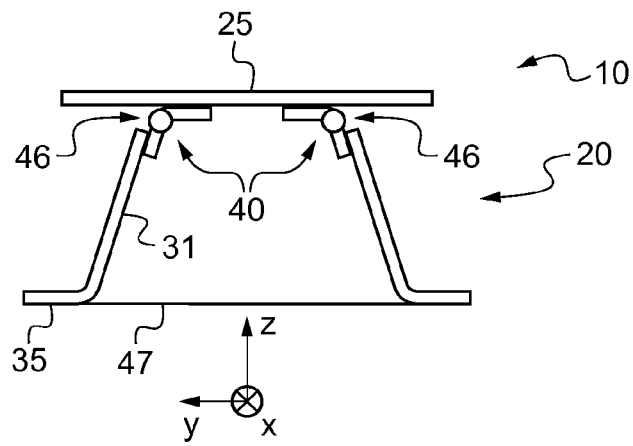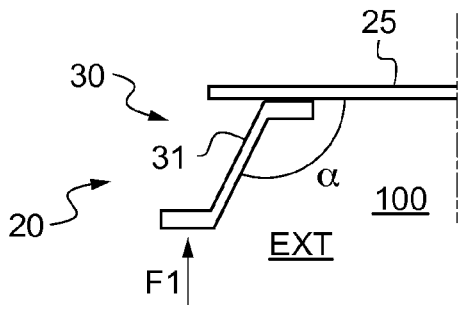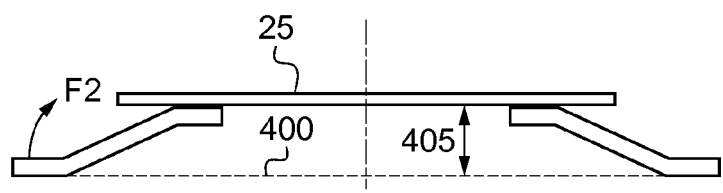

SYSTEM FOR FASTENING A LOAD TO A ROTORCRAFT, AND A ROTORCRAFT

CROSS REFERENCE TO RELATED APPLICATION

The present application claims priority to French patent application No. FR 13 00520 filed on Mar. 7, 2013, the content of which is incorporated in its entirety herein.

BACKGROUND OF THE INVENTION (1) Field of the Invention

The present invention relates to a fastener system for fastening a load to a rotorcraft, and to a rotorcraft provided with the fastener system. The invention also relates to a method of implementing the system.

The technical field of the invention is thus that of devices for fastening an external load to an aircraft, and in particular to an aircraft having a rotary wing.

(2) Description of Related Art

Conventionally, a rotorcraft has a fuselage carrying at least one rotor for providing lift, and possibly also propulsion. The rotorcraft may then be provided with a releasable fastener system for carrying an external load.

Such a fastener system may usually include attachment means. Such attachment means may comprise a release hook that is fastened to the fuselage and optionally swivel-mounted. A sling is then attached to the release hook for the purpose of enabling external loads to be carried.

The attachment means are advantageously positioned under the fuselage close to a point in alignment with the lift rotor for centering purposes. Nevertheless, the rotorcraft might not have any structural element suitable for carrying the attachment means in such a zone.

Under such circumstances, the fastener system may include a support beam for carrying the attachment means. The support beam is then fastened to structural elements of the rotorcraft.

Such a support beam may comprise two vertical section members connected together by a horizontal core. The release hook is housed in a housing defined by the vertical section members and the horizontal core. More precisely, the release hook may extend in the same direction as the vertical section members extend, or it may extend in a direction orthogonal to that direction.

Such a fastener system is in satisfactory use in the field of aviation.

Nevertheless, the support beam may be found to be aggressive in the event of the rotorcraft crashing.

The structure of the beam is relatively indeformable and it runs the risk of penetrating into the fuselage under the effect of reaction from the ground.

The situation is made more complicated when the rotorcraft has fuel tanks in the bottom portion of its fuselage that is supporting the support beam.

In the bottom zone of the fuselage, the rotorcraft then includes in particular a plate that serves to receive pumps, gauges, and other pieces of equipment of the fuel circuit, for example. The plate is designed to withstand contact with the ground in the event of a crash and thus to prevent the tank from leaking. Nevertheless, an impact against the support beam can be destructive.

The technological background remote from the invention includes the following documents: U.S. Pat. No. 5,190,250, DE 196 23 562, U.S. Pat. No. 4,637,575, and U.S. Pat. No. 6,059,266.

BRIEF SUMMARY OF THE INVENTION

An object of the present invention is thus to propose a novel fastener system for carrying a load with a rotorcraft, the fastener system seeking to minimize the risk of the fuselage being perforated in the event of a crash.

According to the invention, a fastener system is provided with attachment means for attaching an external load to a rotorcraft, the fastener system having a support beam for attaching the attachment means to a rotorcraft, the support beam having a horizontal core and two lateral section members extending in elevation from the horizontal core, the fastener system having a support member in a central space between the lateral section members to carry attachment means, the support member being connected to each lateral section member. By way of example, the attachment means may be a simple hook or it may be a release hook.

This system is remarkable in particular in that each lateral section member includes a web in elevation connected to the horizontal core, each web presenting an obtuse angle relative to said horizontal core in the central space, each lateral section member being a sloping section member capable of moving closer to said horizontal core under the effect of vertical forces. A web extends in elevation from the horizontal core towards the ground when the fastener system is arranged on a rotorcraft.

Each lateral section member is thus a sloping section member, unlike conventional vertical section members.

The sloping lateral section members of the support beam present sufficient stiffness in bending to keep the support beam in position in flight. This stiffness in bending is substantially equivalent to the stiffness in bending of a conventional support beam.

In contrast, in the event of a landing and in particular a crash landing, the lateral section members may come into contact with the ground. Under such circumstances, the angle of inclination of the lateral section members is increased. The lateral section members are flattened by moving away from each other.

Thus, the fastener system deforms so as to become less aggressive for the fuselage, and for a tank, where applicable.

The angle of inclination of the lateral webs determines the capacity of the fastener system for flattening. The closer the webs are to the vertical, the more difficult it is to initiate the flattening movement. The designer therefore determines the obtuse angle of the webs as a function of the loads involved, and in particular of the loads in use of the fastener system compared with the contact loads that can be accepted by the fuselage.

Once the flattening movement has been initiated, the obtuse angle of the lateral webs increases. This phenomenon is unstable and leads to the fastener system flattening.

The fastener system may also include one or more of the following additional characteristics.

For example, at least one web extends from a connection end connected to the horizontal core towards a free end, and at least one lateral section member includes a bearing portion secured to the free end of the web.

This bearing portion then comes into contact with the ground in the event of a crash so as to facilitate the transmission of vertical forces into the lateral section members.

The bearing portion may be a component portion of a web. For example, a plate may be folded so as to obtain both a web and the bearing portion.

In a variant, the bearing portion may include a shoulder or the equivalent for fastening to a web using conventional means, such as rivets, screw fasteners, welding means, or adhesive, for example. The bearing portion then has a shape comprising a horizontal segment facing the ground and a sloping segment fastened to a web, the horizontal segment being connected to the sloping segment by an angle equal to said obtuse angle.

This bearing portion may be parallel to the horizontal core.

In another variant, the bearing portion may be perpendicular to the web. Other angles of inclination are possible.

In a first embodiment, at least one lateral section member includes a soleplate for fastening to the horizontal core, and the soleplate is connected to a web by a fastener device.

The web of a section member is thus connected to the core by a soleplate. For this purpose, the fastener device may include conventional means such as rivets, screw fasteners, welding means, or adhesive, for example.

Rivets or the equivalent present the advantage of giving rise to small risks of tearing, which would make the fastener system less effective, while also being sufficiently tolerant of large movements and thus suitable for enabling the webs to flatten without being broken off.

The soleplate is then of a shape including a horizontal portion fastened to the horizontal core and a sloping portion fastened to a web, the horizontal portion being connected to the sloping portion by said obtuse angle.

Furthermore, the soleplate may be arranged in said central space in order to avoid impeding flattening of the web.

In a second embodiment, at least one lateral section member comprises a soleplate for fastening to the horizontal core, and said soleplate is integral with a web so as to form a one-piece mechanical part.

A method of machining away material then makes it possible to obtain a mechanical part presenting both a fastener soleplate and a web. The mechanical part presents a soleplate that is horizontal and fastened to the horizontal core and a web that is sloping, the horizontal soleplate joining the sloping web at said obtuse angle.

The web may include a junction zone with a soleplate, and the junction zone may present a rounded portion to encourage the web to bend towards the horizontal core.

In a third embodiment, at least one web is hinged to the horizontal core by means of a hinge, and said fastener system includes retaining means connecting one lateral section member to the other lateral section member.

The web thus becomes particularly easily movable relative to the horizontal core. Under such circumstances, the retaining means prevent the lateral section members from flattening, except during a crash.

The retaining means may comprise a rod having a breakable zone suitable for breaking in the event of a crash in order to allow the support beam to flatten.

Furthermore, the support member may include a fitting co-operating with the lateral section members.

The fitting is then arranged in the central space in order to carry attachment means.

The fitting may be fastened to each web, e.g. between the middle of each web and a connection end of each web that is connected to the horizontal core.

Under such circumstances, the system provides a zone for fastening the fitting to the web that is sufficient to transmit the loads and that withstands fatigue sufficiently well. This fastener zone nevertheless remains sufficiently small at least to avoid opposing the splaying out movement of the beam.

Under such circumstances, the influence of the fitting on flattening is limited. The fastening between the fitting on a web may also be designed to break as from a shear threshold in the event of transverse forces being exerted by the web.

At least one lateral section member may have a soleplate for fastening to the horizontal core, and the fitting may be fastened to each soleplate.

The fitting is then fastened to the web laterally, and to a soleplate in elevation.

Optionally, each web includes an orifice, with a pin of said fitting passing therethrough. The fitting may then give rise to vertical forces in the lateral section members when the fastener system is carrying an external load.

Furthermore, the fitting may include a spring member for moving attachment means away from a direction extending in the gravity direction. In the event of a crash, the attachment means come into contact with the ground. The angle of inclination of the attachment means then gives rise to the attachment means tilting so as to cause it to lie down.

The risk of the attachment means damaging the fuselage is thus reduced.

In addition to a fastener system, the invention also provides a rotorcraft including the fastener system.

Furthermore, the invention also relates to a method of implementation. Thus, the invention provides a method of fastening an external load to a rotorcraft with the help of a fastener system provided with attachment means, the fastener system having a support beam for attaching the attachment means to a rotorcraft, the support beam having a horizontal core and two lateral section members extending in elevation from the horizontal core. Furthermore, the fastener system comprises a support member in a central space between the lateral section members in order to carry attachment means, said support member being connected to each lateral section member.

In this method, each lateral section member is inclined so as to obtain a sloping section member presenting an obtuse angle relative to the horizontal core in the central space so that each lateral section member moves closer to the horizontal core under the effect of vertical forces so as to be less aggressive for a fuselage of the rotorcraft, and the support member is fitted with a fitting provided with a spring member for moving the attachment means away from a direction extending in the gravity direction.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIGS. 7 and 8 are diagrams showing a second embodiment;

FIG. 9 is a diagram showing a third embodiment; and

FIGS. 10 and 11 are diagrams explaining the operation of the invention.

DETAILED DESCRIPTION OF THE INVENTION

Elements present in more than one of the figures are given the same references in each of them.

It can be seen that three mutual orthogonal directions, X, Y, and Z are shown in some of the figures.

The first direction X is said to be longitudinal. The term "longitudinal" relates to any direction of the fastener system parallel to the first direction X.

The second direction Y is said to be transverse. The term "transverse" relates to any direction of the fastener system that is parallel to the second direction Y.

Finally, the third direction Z is said to be in elevation. The term "in elevation" relates to any direction of the fastener system that is parallel to the third direction Z.

Figure 1:
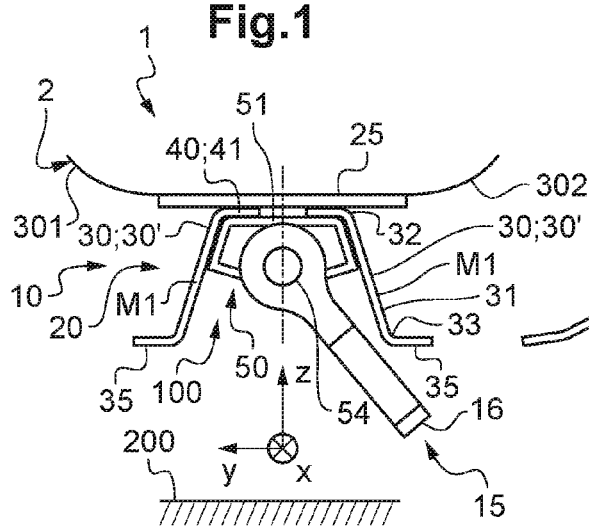
FIGS. 1 and 2 are diagrams showing a first arrangement of attachment means.

FIG. 1 shows a rotorcraft 1 having a fuselage 2.

To carry a load, a rotorcraft is fitted with a fastener system 10.

The fastener system 10 includes attachment means 15. The attachment means may be a hook 16 or indeed a release hook, for example. The attachment means 15 may be connected to an external load, in particular by means of a sling.

To attach the attachment means 15 to the rotorcraft, the fastener system includes a support beam 20 co-operating with a support member 50.

This support beam 20 is provided with a horizontal core 25 extending in a longitudinal direction X. The support beam may extend along an axis going from the front 303 towards the rear 304 of the fuselage in the configuration of FIG. 1, or indeed from the left side 302 to the right side 301 of the fuselage of FIG. 3.

Furthermore, and with reference to FIG. 1, the support beam 20 has two lateral section members 30 extending on either side of a central space 100. More precisely, the two lateral section members 30 extend from the horizontal core towards the ground 200 when the rotorcraft is standing on the ground.

Each lateral section member may extend in the longitudinal direction along all or part of length of the horizontal support core. The central space 100 is thus open, while being defined in elevation by the horizontal core 25 and transversely by the lateral section members 30.

The support member then extends in the central space 100 from a first lateral section member 30' towards a second lateral section member 30".

The attachment means are thus suspended from the support member, possibly being free to turn relative to said support member.

With reference to FIG. 10, each lateral section member 30 is a sloping section member presenting an obtuse angle α relative to the horizontal core in the angular sector that defines the internal space 10. The two lateral section members thus define transversely a flared internal space of frustoconical shape extending in elevation from a large base that is open to the outside EXT of the support beam 20 towards a small base level with the horizontal core.

The support beam therefore does not have vertical lateral section members, since, on the contrary, it is provided with sloping lateral section members.

With reference to FIGS. 10 and 11, a vertical force F1 exerted on a sloping lateral section member causes the lateral section member to be flattened by turning along arrow F2. The two lateral section members therefore tend to move apart from each other, enlarging the large base 400. In contrast, the height 405 of the internal space decreases.

Under such circumstances, and with reference to FIG. 1, each lateral section member 30 includes an inclined web 31 presenting said obtuse angle α relative to the horizontal core. Each web thus extends in elevation towards the ground along a direction that is inclined relative to gravity from a connection end 22 connected to the horizontal core 25 towards a free end 33.

In order to make it easier to impart vertical forces to the lateral section members 30, at least one lateral section member may include a bearing portion 35 connected to the free end 33 of a web.

The bearing portion 35 may be plane and parallel to the horizontal core. In addition, the bearing portion 35 may extend transversely from the web away from the central space 100.

Furthermore, at least one lateral section member 30 includes a soleplate 40 for fastening a web to the horizontal core 25. Each soleplate 40 then includes at least a horizontal portion 41 fastened to the horizontal core 25.

The soleplate is also secured to a web.

Figure 5:
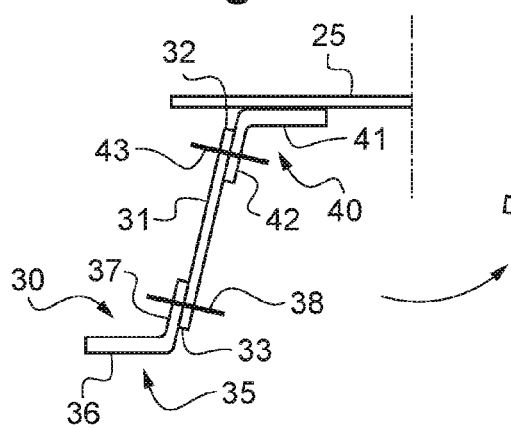
FIGS. 5 and 6 are diagrams showing a first embodiment.
Figure 6:
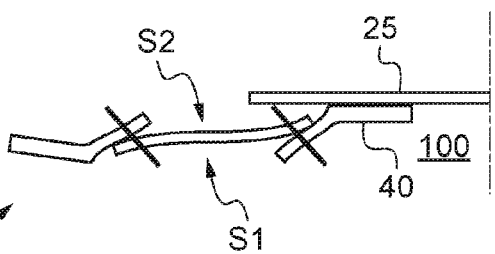

In a first embodiment shown in FIGS. 5 and 6, the soleplate is fastened to a web by a fastener device 43, such as a device having at least one rivet.

The soleplate 40 is provided for this purpose with a horizontal portion 41 that is fastened to the horizontal core and a sloping portion 42 that is fastened to a web, and in particular to its connection end.

Likewise, the bearing portion may have a horizontal segment 36 and a sloping segment 37 that is fastened to a web, and in particular to its free end 33.

With reference to FIG. 6, the soleplate 40 may be arranged in the central space. This soleplate is then fastened to an internal surface S1 of a web 31 facing the internal space 100.

Conversely, a bearing portion may be fastened to an external surface of a web 31.

In a second embodiment shown in FIG. 7, a combined web and soleplate, possibly also combined with the bearing portion, forms a one-piece sloping section member.

Optionally, and in order to encourage the splaying out that can be seen in FIG. 8 under the effect of vertical forces, a web may include a junction zone 44 with a rounded portion 44'. This rounded portion 44' may have a concave side facing towards the outside of the support beam.

Conversely, a web may be connected to a bearing portion via a rounded portion presenting a concave side that faces towards the central space 100.

In a third embodiment as shown in FIG. 9, a soleplate may include a hinge 46. Breakable retaining means 47 may additionally connect the two lateral section members together.

Furthermore, and with reference to FIG. 1, the support member 50 includes a fitting 51 that co-operates with the lateral section members 30.

Consequently, the fitting 51 is fastened to each web 31. For example, the fitting is fastened between the middle M1 of each web 31 and a connection end 32 of each web 31. In addition, the fitting 51 is fastened to the soleplate 40 of the lateral section members.

Figure 3:
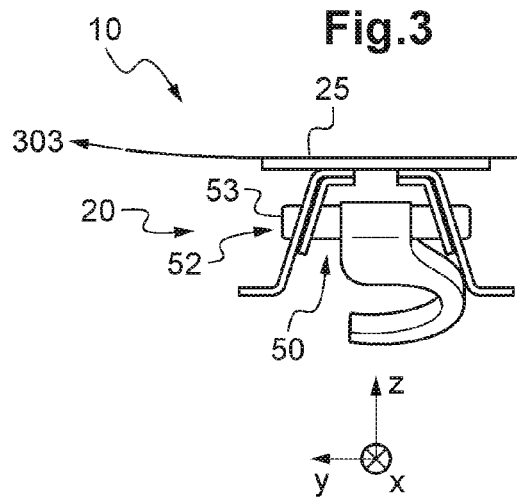
FIGS. 3 and 4 are diagrams showing a second arrangement of attachment means.

With reference to FIG. 3, each web 31 may include an orifice 52 having a pin 53 of the fitting 51 passing therethrough.

Furthermore, and with reference to FIG. 1, the fitting 51 is provided with a spring member 54 for tending to move the attachment means 15 away from a vertical direction in the gravity direction, under the effect of turning. By way of example, the spring member is arranged between the fitting and the attachment means.

Figure 2:
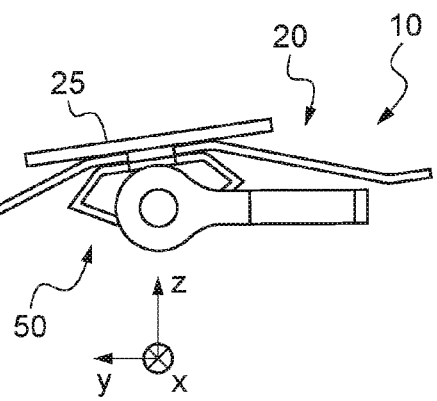
Figure 4:
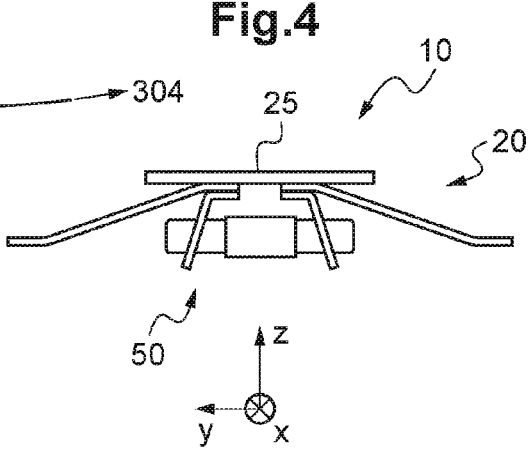

Thus, in the event of a crash landing and with reference to FIGS. 2 and 4, the lateral section members move apart from each other so as to cause the support beam to be flattened. Likewise, the attachment means tends to lie down on the ground.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

Furthermore, FIGS. 1 and 2 and then FIGS. 3 and 4 show a support beam that is arranged longitudinally. The same principle can be applied with a support beam that extends transversely, i.e. that extends in a direction parallel to the second direction Y.

Making a selection of this type (longitudinal/transverse) generally depends on the overall architecture of the machine (position of longitudinal beams and of strong frames).

What is claimed is:

1. A fastener system having attachment means for attaching an external load to a rotorcraft, the fastener system having a support beam for attaching the attachment means to a rotorcraft, the support beam having a horizontal core and two lateral section members extending in elevation from the horizontal core, the fastener system having a support member in a central space between the lateral section members to carry attachment means, the support member being connected to each lateral section member, wherein each lateral section member includes a web in elevation connected to the horizontal core, each web presenting an obtuse angle (α) relative to the horizontal core in the central space, each lateral section member being a sloping section member capable of moving closer to the horizontal core under the effect of vertical forces, the support member including a fitting co-operating with the lateral section members, the fitting including a spring member for moving an attachment means away from a direction extending in the gravity direction, the support beam directly connecting to a fuselage of the rotorcraft.

2. A system according to claim 1, wherein at least one web extends from a connection end connected to the horizontal core towards a free end, and at least one lateral section member includes a bearing portion secured to the free end of the web.

3. A system according to claim 2, wherein the bearing portion is parallel to the horizontal core.

4. A system according to claim 1, wherein at least one lateral section member includes a soleplate for fastening to the horizontal core, and the soleplate is connected to a web by a fastener device.

5. A system according to claim 4, wherein the soleplate is arranged in the central space.

6. A system according to claim 1, wherein at least one lateral section member comprises a soleplate for fastening to the horizontal core, and the soleplate is integral with a web so as to form a one-piece mechanical part.

7. A system according to claim 6, wherein a web has a junction zone with a soleplate, and the junction zone presents a rounded portion to encourage the web to bend towards the horizontal core.

8. A system according to claim 1, wherein at least one web is hinged to the horizontal core by means of a hinge, and the fastener system includes retaining means connecting one lateral section member to the other lateral section member.

9. A system according to claim 1, wherein the fitting is fastened to each web between the middle of each web and a connection end of each web that is connected to the horizontal core.

10. A system according to claim 1, wherein at least one lateral section member has a soleplate for fastening to the horizontal core, and the fitting is fastened to each soleplate.

11. A system according to claim 9, wherein each web includes an orifice with a pin of the fitting passing therethrough.

12. A rotorcraft, including a fastener system according to claim 1.

13. A system according to claim 1, wherein the attachment means is carried by the fitting.

14. A fastener system for attaching an external load to a rotorcraft comprising:
a horizontal support beam to directly connect to a fuselage of the rotorcraft;
first and second lateral members directly connected to and extending in elevation from the beam and defining a central space therebetween, each lateral member having a sloping web section oriented at an obtuse angle relative to the beam in the central space to move closer to the beam in response to an upward vertical force;
a support member positioned within the central space, the support member directly connected to the first and second lateral members and extending therebetween;
a hook connected to the support member and carried in the central space by the support member; and
a spring member connected to the hook and the support member to turn the hook relative to the support beam.

15. A fastener system according to claim 14 wherein the support member is directly connected to each lateral member from a middle of each web section to a connection end of each lateral member, the connection end of each lateral member being directly connected to a respective end region of the horizontal support beam.

16. A fastener system according to claim 14 wherein each lateral member has a soleplate at a first connection end of the lateral member to connect to the horizontal support beam, and a bearing portion at a second free end of the lateral member, the soleplate forming a planar surface to mate with the beam, the bearing portion forming a horizontal segment to face a ground surface, the sloping web section extending between and connecting the soleplate and the bearing portion.

17. A fastener system according to claim 14 wherein each lateral member has a first connection end connected to the horizontal support beam and a second free end; and
wherein the first and second lateral members define transversely the central region as a flared internal space of frustoconical shape extending in elevation from a large base that is open and adjacent to free ends of the first and second lateral members towards a small base level with the beam and adjacent to the connection ends of the first and second lateral members.

18. A fastener system of claim 14 wherein each lateral member extends from the support beam towards a ground surface such that each lateral member is spaced apart from the ground surface when the rotorcraft is standing on the ground surface.

19. A method of fastening an external load to a rotorcraft with the help of a fastener system provided with attachment means, the fastener system having a support beam for attaching the attachment means to a rotorcraft, the support beam having a horizontal core and two lateral section members extending in elevation from the horizontal core, the fastener system having a support member in a central space between the lateral section members in order to carry attachment means, the support member being connected to each lateral section member, wherein each lateral section member is inclined so as to obtain a sloping section member presenting an obtuse angle ($\alpha$) relative to the horizontal core in the central space so that each lateral section member moves closer to the horizontal core under the effect of vertical forces so as to be less aggressive for a fuselage of the rotorcraft, and wherein the support member is fitted with a fitting provided with a spring member for moving the attachment means away from a direction extending in the gravity direction, the support beam being directly connected to a fuselage of the rotorcraft and being independent of a rotorcraft landing gear.

* * * * *